United States Patent
Garcia Sanz et al.

(10) Patent No.: US 9,017,521 B2
(45) Date of Patent: Apr. 28, 2015

(54) PROCESS FOR HEAT TREATMENT OF BIOMASS WITH A COOLANT SOLID

(75) Inventors: Elena Garcia Sanz, Lyons (FR); Matthieu Rolland, Vernaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 769 days.

(21) Appl. No.: 13/322,639

(22) PCT Filed: May 6, 2010

(86) PCT No.: PCT/FR2010/000353
§ 371 (c)(1),
(2), (4) Date: Nov. 28, 2011

(87) PCT Pub. No.: WO2010/136662
PCT Pub. Date: Dec. 2, 2010

(65) Prior Publication Data
US 2012/0067987 A1 Mar. 22, 2012

(30) Foreign Application Priority Data
May 29, 2009 (FR) .................................. 09 02623

(51) Int. Cl.
*C10B 49/00* (2006.01)
*F26B 3/20* (2006.01)

(52) U.S. Cl.
CPC .............. *F26B 3/205* (2013.01); *F26B 2200/02* (2013.01)

(58) Field of Classification Search
CPC .......... C10B 49/00; C10B 53/02; C10B 53/08
USPC .................. 201/2.5, 5, 8, 21, 31, 32, 33, 34; 48/197 R
See application file for complete search history.

(56) References Cited

U.S. PATENT DOCUMENTS

| | | | |
|---|---|---|---|
| 4,750,913 A | 6/1988 | Siddoway | |
| 5,215,670 A | 6/1993 | Girovich | |
| 5,423,891 A * | 6/1995 | Taylor | 48/197 R |
| 6,203,765 B1 * | 3/2001 | Taciuk et al. | 422/210 |

(Continued)

FOREIGN PATENT DOCUMENTS

| | | |
|---|---|---|
| DE | 1 028 095 B | 4/1958 |
| DE | 10 2007 015089 A1 | 10/2008 |

(Continued)

OTHER PUBLICATIONS

International Search Report, dated Aug. 18, 2010, issued in corresponding PCT/FR2010/000353.
Written Opinion, dated Aug. 18, 2010, issued in corresponding PCT/FR2010/000353.

*Primary Examiner* — Nina Bhat
(74) *Attorney, Agent, or Firm* — Millen, White, Zelano & Branigan, P.C.

(57) ABSTRACT

A process for heat treatment of a solid, with a coolant solid, in which a stage for mixing the solid with the pre-heated coolant solid is carried out, with the coolant solid being a solid hydrocarbon. The solid hydrocarbon is ground, before the mixing stage with the solid, to obtain a solid hydrocarbon powder with a grain size of between 20 μm and 300 μm. The solid is ground, before the mixing stage with the coolant solid, to obtain solid pellets with a thickness of between 1 mm and 30 mm, a width of between 1 mm and 40 mm, and a length of between 1 mm and 100 mm. The mixing is carried out at a temperature of between 80° C. and 700° C.

10 Claims, 1 Drawing Sheet

(56) References Cited

U.S. PATENT DOCUMENTS

| | | | |
|---|---|---|---|
| 6,506,223 B2 * | 1/2003 | White | 44/551 |
| 7,077,878 B1 * | 7/2006 | Muhlen et al. | 48/198.1 |
| 2006/0112639 A1 * | 6/2006 | Nick et al. | 48/198.1 |
| 2010/0083575 A1 * | 4/2010 | Varadaraj et al. | 48/209 |

FOREIGN PATENT DOCUMENTS

| | | |
|---|---|---|
| FR | 497 476 A | 12/1912 |
| FR | 458 373 A | 10/1913 |
| FR | 1 414 191 A | 10/1965 |
| WO | WO 2010/137028 | * 12/2010 |

* cited by examiner

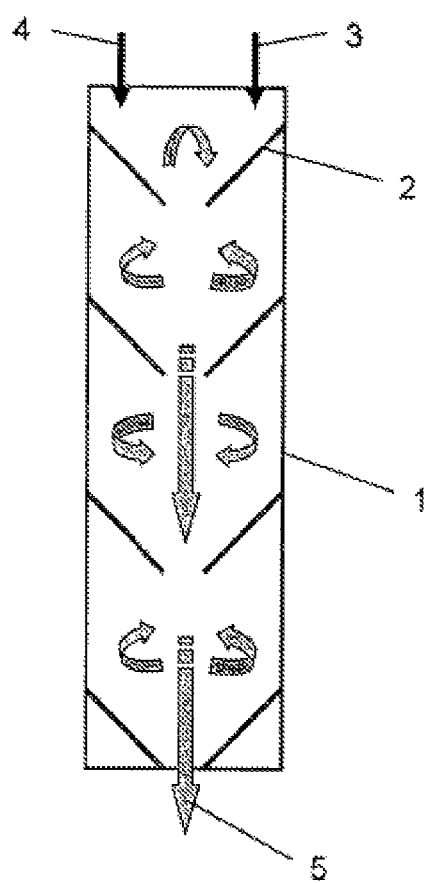

PROCESS FOR HEAT TREATMENT OF BIOMASS WITH A COOLANT SOLID

This invention relates to the processes for heat treatment of solids with a coolant solid, and more particularly a roasting process or a pyrolysis process according to the temperatures that are used, of solids such as wastes of any nature, or, for example, biomass, with a coolant solid.

Roasting is a heat treatment of solids and, for example, of biomass at mean temperatures of, on average, between 200° C. and 300° C. and in the absence of oxygen. Below 270-300° C. in accordance with gasolines, the roasting reactions are endothermic and require a supply of heat to be implemented. Above a temperature of 270-300° C. in accordance with gasolines, exothermic reactions for degradation of biomass begin and are self-sustained by the action of thermal acceleration of kinetics. These reactions lead to pyrolyzed solids that have lost a large amount of their mass and their energy. The loss of yield is significant. From an economic standpoint, when the desired heat treatment is roasting, it is necessary to be placed under conditions where the exothermic reactions may not have taken place, which imposes limiting the contact temperature of the hot walls. In the case where the desired heat treatment is pyrolysis, it is then necessary to be placed beyond 300° C., and more particularly between 400° C. and 700° C.

The objective of the roasting of biomass is in general obtaining a feedstock that can be used in other processes such as, for example, the production of fuels for producing electricity or the production of liquid hydrocarbons such as diesel, diesel fuel or kerosene. In some cases, it is necessary to roast the biomass before the gasification stage prior to the treatments that make it possible to produce hydrocarbons.

In the prior art, processes for preparation of a mixture of feedstocks for the purpose of gasification by preparing the feedstocks individually and then by mixing them are already known. The preparation of the biomass comprises the drying, roasting, and grinding of biomass, or any of these stages. The energy that is necessary to the drying and to the roasting of biomass can be provided by different technologies:

- By gas stream: the circulation of hot gases (vapor, carbon dioxide, nitrogen) provides the necessary energy. However, this solution is currently very expensive because of the very high flow rates that are necessary on industrial scales (120 t/h) and is therefore difficult to apply to the industrial facilities, in particular for roasting.
- By contact with a hot wall: for example a rotary furnace or a screw furnace. However, the temperature of the walls, and therefore the capacity of the industrial-scale furnaces, is limited by the fact of heat runaways of the roasting reactions (starting from 270° C. -300° C.). Actually, within the required temperature range (between 200 and 300° C.), the radiative transfers are insignificant. It is therefore necessary, so as to increase the heat transfer, to increase the transfer by conduction. The transfers by conduction are proportional to the contact surface, to the temperature difference between the feedstock and the wall, and to the heat conductivity of the feedstock that is low in this case (typically 10-20 W/m²/° C. for the wood). The feedstock-wall temperature difference is limited by the very nature of the lignocellulosic biomass (runaway of reactions if hot points are beyond 270° C.-300° C.). The sole option for increasing the thermal fluxes is therefore to increase the surface area, and therefore the volume of the furnaces.
- By direct radiation of a flame at the output of a burner. This technology has as a drawback the possible generation of very hot points close to the flame, as well as the risk of exposure of the feedstock with the oxygen obtained from incomplete combustion.
- By mixing with a coolant solid: the solids are selected for their thermal inertia and their capacity to be recycled in the facility after their mixing with the biomass (resistance to abrasion and ease of transport) and their cost. The sands or ceramics (alumina, alumino-silicates) are the best choices according to these criteria. In contrast, their use with the biomass would require a perfect separation to prevent degradation of the biomass mill (abrasion) downstream from the dryer or the roasting device, as well as degradation of the burner and the walls of the gasifier. Because of the fibrous nature of the wood, it is impossible to achieve a perfect separation, which leads to eliminating sand- or ceramic-based technology for the drying and roasting of biomass.

This invention therefore has as its object to remedy one or more drawbacks of the prior art by proposing a process for heat treatment of solids with a coolant solid, for example such as biomass that makes it possible to improve the heat treatment, and, for example, roasting, of solids without a costly investment.

For this purpose, this invention proposes a process for heat treatment of a solid, with a coolant solid, in which a stage for mixing a solid with the preheated coolant solid is carried out, with the coolant solid being a solid hydrocarbon.

According to one embodiment of the invention, the solid hydrocarbon is ground, before the mixing stage with the solid, to obtain a solid hydrocarbon powder with a grain size of between 20 μm and 300 μm.

According to one embodiment of the invention, the solid is shredded, before the mixing stage with the solid hydrocarbon, to obtain solid pellets.

According to one embodiment of the invention, the solid pellets have a thickness of between 1 mm and 30 mm, with a width of between 1 mm and 40 mm, and a length of between 1 mm and 100 mm.

According to one embodiment of the invention, the mixing temperature is between 80° C. and 700° C.

According to one embodiment of the invention, the solid hydrocarbon is heated, before the mixing, to a temperature of between 100° C. and 900° C.

According to one embodiment of the invention, the mixture is produced in a reactor such as a rotary furnace, a screw furnace, a hearth furnace, a boiling fluidized bed or a circulating fluidized bed.

According to one embodiment of the invention, the walls of the rotary furnace are heated to a temperature of between 80° C. and 700° C.

According to one embodiment of the invention, the solid is biomass.

According to one embodiment of the invention, the level of moisture of the biomass is between 10 and 50%.

According to one embodiment of the invention, the solid hydrocarbon is petroleum coke or carbon or carbon derivatives or anthracite or deasphalting residues.

According to one embodiment of the invention, the heat treatment is a drying treatment.

According to another embodiment of the invention, the heat treatment is a roasting treatment.

According to another embodiment of the invention, the heat treatment is a pyrolysis treatment.

BRIEF DESCRIPTION OF THE DRAWINGS

Other characteristics and advantages of the invention will be better understood and will emerge more clearly from reading the description given below by referring to the accompanying FIG. 1, provided by way of example and which is a diagrammatic representation of a variant of an implementation of the process according to the invention.

The invention relates to a heat treatment process such as, for example, drying, roasting, or pyrolysis, of solids and, for example, wastes such as household, agricultural, and industrial wastes, and solid biomass. The solid biomass that is treated in the process according to the invention can be, for example, lignocellulose (wood, straw, algae, timber and agricultural waste), purified lignin, cellulose or a mixture of these different biomasses. The roasting that is carried out within the framework of the invention consists of a heat treatment that is carried out at mean temperatures of generally between 200° C. and 300° C., and preferably between 220° C. and 280° C. and in the absence of oxygen.

The pyrolysis that is carried out within the framework of the invention consists of a heat treatment that is carried out at mean temperatures of generally between 300° C. and 700° C. and in the absence of oxygen.

The process can also be used only for drying the solid. In this case, the heat treatment temperatures are less than those in which the roasting is produced, between 80° C. and 150° C.

The process can thus be carried out at temperatures that range from 80° C. for drying to 700° C. for pyrolysis.

The heat treatment process according to the invention consists in using a coolant solid, mixed with the solid in a heating reactor, which does not require separation at the end of the heat treatment. For this purpose, in the process according to the invention, the coolant solid that is used is a fuel and more particularly a solid hydrocarbon. The solid hydrocarbon is eliminated or consumed during subsequent uses of the mixture, for example during gasification. It therefore does not require separation at the end of the heat treatment. The solid hydrocarbons that can be used in the process according to the invention are generally solids with a high level of carbon, for example: petroleum coke (also called petcoke for petroleum coke according to English terminology), carbon, carbon derivatives, anthracite, and deasphalting residues.

Before being mixed with the solid to be roasted, the solid hydrocarbon in general is to be ground because the grinding mechanisms of these two materials are different. The grinding of the solid hydrocarbon is generally done by crushing, or any other equivalent technique that is well known to one skilled in the art and that makes it possible to obtain a solid hydrocarbon powder with a very fine grain size, of generally between 20 μm and 300 μm, and preferably between 50 μm and 200 μm. A very fine grain size makes possible an increase of the contact surface of the solid hydrocarbon with the solid, which also increases the heat transfer by conduction and thus makes possible a better heat treatment.

The grinding of the solid hydrocarbon is generally carried out under a stream of hot nitrogen for drying it and for preventing any contact with ambient air. This stream of hot nitrogen has a temperature that is in general between 250-500° C. and can advantageously be used also to heat the solid hydrocarbon.

Before mixing with the solid hydrocarbon, the solid and more particularly the biomass are to be shredded or ground by shearing or any other equivalent technique that is well known to one skilled in the art and that makes it possible to obtain solid pellets.

The pellets have a thickness of between 1 mm and 30 mm, preferably between 5 mm and 25 mm, and in a very preferred manner between 5 mm and 10 mm; their width is between 1 mm and 40 mm, preferably between 15 mm and 25 mm, and in a very preferred manner between 18 mm and 22 mm; their length is between 1 mm and 100 mm, preferably between 25 mm and 75 mm, and in a very preferred manner between 45 mm and 55 mm. The thus obtained pellets can be mixed directly with solid hydrocarbon without preliminary drying.

The solid can optionally be used wet, with the level of moisture being between 10 and 50%.

According to a variant of the process, the solid is dried before being mixed with the solid hydrocarbon; in this case, the level of moisture is less than 15%.

The solid hydrocarbon is in general heated before being mixed with the solid.

In general, the introductions of the solid and the solid hydrocarbon are done separately by separate feed hoppers. The introduction of the solid and the solid hydrocarbon can also be done by any conventional methods for introduction into a furnace that are well known to one skilled in the art.

The injection temperature of the solid hydrocarbon is to be adequate so that the mixing temperature is in the temperature range of the desired reactions (drying, roasting, or pyrolysis). So that the desired temperature of the mixture is between 80° C. and 700° C., it is therefore necessary that the temperature of the solid be greater than this desired temperature. Actually, during the mixing, the temperature of the mixture is less than that of the hydrocarbon following heat exchanges between the hydrocarbon and the solid. The hydrocarbon is therefore heated before being mixed with the solid at a temperature of between 100° C. and at least 900° C., preferably between 330° C. and 592° C., and in a very preferred manner between 350° C. and 550° C. The heating temperature is generally defined based on the desired final temperature of the mixture, and the initial temperature of the solid. Actually, depending on whether the solid is mixed in the wet or dry state, its initial temperature is not the same. In general, the initial temperature of the solid is between the ambient temperature (for example, 15° C.) and 180° C., preferably between 20° C. and 150° C., and in a very preferred manner between 25° C. and 120° C.

The preliminary heating of the solid, on the one hand, and the solid hydrocarbon, on the other hand, can be done according to any techniques that are well known to one skilled in the art and, for example, in a rotary furnace heated with vapor or with combustion smoke, in a furnace with a low-temperature stage, by passing into a heated tunnel, or in a screw furnace, by exchange with hot gases at the outlet of the mill.

During the solid/solid hydrocarbon mixing, the solid hydrocarbon is deposited in several layers around each solid pellet. It is possible that hot points occur when the solid pellets are brought into contact with the first layer of solid hydrocarbon powder. However, this phenomenon is very short and has no effect on the biomass. Actually, with the size of a solid hydrocarbon particle being small, the available heat is also low (on the order of 0.3 mJ). This heat is used in a first step for the evaporation of water that is present in the solid in the form of moisture (wet solid) or bound water (dry solid). The phase change, i.e., the evaporation of water, consumes all of the heat provided by the first solid hydrocarbon layer. The solid hydrocarbon that is present in the mixture and cooled by its contact with the entire solid is deposited, by a mixing effect, to form a new layer on the solid pellets. The first layer, as well as the next layers, serves as an insulating material with the solid pellet and thus limits the thermal flux. The solid pellets thus are not exposed to temperatures that are greater than 280° C. in general. The mixing is done in a heating reactor with mixing of the bed, and, for example, in:

A rotary furnace,
A screw furnace,
A hearth furnace,
A boiling fluidized bed.

Implementation of the Process in a Furnace:

When the solid hydrocarbon powder and the solid are brought into contact in a rotary furnace, a screw furnace, or a hearth furnace, the walls of the furnace are heated in the case of roasting at a temperature of between 150° C. and 300° C., and preferably between 180° C. and 280° C., by outside circulation of hot gas or by electric resistors or by burners arranged on the outside of the furnace. In general, the terminal part of the furnace is not heated to make possible the cooling at ambient temperature of the mixture before the outlet of the furnace.

At the outlet of the furnace, it is possible to provide a system for rough separation of the solid hydrocarbon and the roasted solid so that the entire solid hydrocarbon is not then ground with the roasted solid.

It is also possible to provide a recirculation of the solid hydrocarbon during which it is reheated again (pneumatic transport or else endless screw) before being reinjected into the feed hopper.

The dried, roasted or pyrolyzed solid is then injected, in a mixture or not with the solid hydrocarbon, depending on whether there has been rough separation or not, into a solid mill.

Implementation of the Process in a Boiling Fluidized Bed:

Bringing the solid hydrocarbon powder and the solid into contact can also be done in a perfectly-stirred reactor of the boiling fluidized-bed type. The injection into the fluidized bed is done for the solid by gravity and for the solid hydrocarbon by pneumatic injection (dense phase transport with fluidization gas). So as to monitor the dwell time of the particles in the reactor, which is generally between 8 minutes and 180 minutes, and preferably between 20 minutes and 60 minutes, two solutions are possible:

- Use of several reactors that are perfectly stirred in series: the passage of the feedstock from reactor to reactor as well as the recovery of the product is done by overflowing.
- Use of a reactor (1) with internals (2): the biomass feedstock (4) and solid hydrocarbon feedstock (3) are introduced at the top or by a side of the reactor, and the perfectly-stirred fluidized bed moves downward or toward the opposite side of the reactor in the manner of a moving bed using the action of the internals. The product is recovered at the bottom (5) of the reactor as illustrated in FIG. 1. This solution is equivalent to the first; it involves a series of fluidized beds that are stirred but are in the same reactor.

Just as for the implementation in a furnace, at the outlet of the reactor, it is possible to provide a system for rough separation of the solid hydrocarbon and the roasted solid so that the entire solid hydrocarbon is not ground then with the roasted solid.

It is also possible to provide for a recirculation of the solid hydrocarbon during which it is reheated again (pneumatic transport or else endless screw) before being reinjected into the feed hopper.

The dried, roasted or pyrolyzed solid is then injected, in a mixture or not with the solid hydrocarbon, depending on whether there has been rough separation or not, into a solid mill.

The following comparison examples illustrate this invention.

EXAMPLES 1 to 4

The contact between the solid (feedstock 1) that is, in these examples, biomass, and the solid hydrocarbon (feedstock 2) that is petroleum coke is made in a rotary furnace whose walls are heated at 250° C. by outside circulation of hot gas. The terminal part of the furnace is not heated to make it possible to cool the mixture at ambient temperature before the outlet of the furnace.

The initial and final temperatures are determined based on enthalpies of the two feedstocks.

|  | Example 1 (Roasting) | Example 2 (Roasting) | Example 3 (Roasting) | Example 4 (Drying) |
|---|---|---|---|---|
| Initial Temperature (° C.) of the Wet Biomass (Level of Moisture 25%) |  |  | 25 | 25 |
| Initial Temperature (° C.) of the Dry Biomass | 100 | 100 |  |  |
| Initial Temperature (° C.) of Petroleum Coke | 568 | 330 | 592 | 340 |
| Quantity of Biomass/Petroleum Coke (% by Mass) | 80/20 | 50/50 | 50/50 | 50/50 |
| Final Temperature (° C.) | 250 | 250 | 250 | 100* |

*The biomass is totally dried

These examples illustrate that regardless of the initial temperature of the biomass, it is possible to obtain a perfectly dried or roasted biomass simply by adapting the temperature of the solid hydrocarbon as well as these quantities.

Example 5

This example has as its object to determine the time that is necessary for reaching an equilibrium temperature between the biomass and petroleum coke.

The 2D simulations of the non-steady-state heat transfer are executed with the Comsol® software. The case that is studied is the following:

Petroleum coke bed (60 mm×60 mm) with 4 biomass pellets (thickness 10 mm, length 30 mm).

$T_{petroleum\ coke} = 300°$ C.

$T_{biomass} = 100°$ C.

$\rho_{petroleum\ coke} = 600$ kg/m$^3$ (bulk density); $cp_{petroleum\ coke} = 3,200$ J/kg K;

$\lambda_{petroleum\ coke} = 0.4$ W/m k (conductivity)

$\rho_{biomass} = 600$ kg/m$^3$ (density of the particle); $cp_{biomass} = 1,700$ J/kg K (specific heat); $\lambda_{biomass} = 0.1$ W/m k (conductivity).

To simulate the mixing, the conductivity of petroleum coke is increased to 40 W/m k (factor 100). However, around each biomass pellet, a fine layer of petroleum coke (0.5 mm) remains bonded (due to the roughness of the surface of the biomass), and it does not participate in the mixing. In this zone, the actual conductivity of petroleum coke is maintained.

The layer of petroleum coke that remains bonded to the wall of the biomass pellet makes possible adequate insulation in the first seconds of contact between the two solids, and the maximum temperature of the surface of the biomass pellets at the initial moment is 274° C. The equilibrium temperature (257° C.) is reached at the end of 8.3 minutes. The temperature inside the pellets is quite homogeneous (maximum difference less than 1° C. at the end of 8 minutes).

These results show that the necessary time that it takes to reach an equilibrium temperature between the biomass and petroleum coke is rather short.

Example 6

Starting from the results of Example 5, it is possible to size a furnace.

Case of a Rotary Furnace:
Filling rate of 20%,
$10^{th}$ of biomass+$10^{th}$ of petroleum coke that are treated,
Dwell time of 10 minutes.
The dimensions that are obtained for the rotary furnace are:
Lengt =10 m and Diameter=2 m.

Case of a Screw Furnace:
Filling rate of 55%,
$10^{th}$ of biomass+$10^{th}$ of petroleum coke that are treated,
Dwell time of 10 minutes.
The dimensions that are obtained for the rotary furnace are:
Length=6.5 m and Diameter=1.5 m.

These results demonstrate the fact that the process according to the invention makes it possible to use furnaces of conventional dimensions, and even of smaller dimensions. Actually, the large pore size of the bed of biomass pellets causes the gaps to be filled with petroleum coke, and thus the increase in the volume due to the addition of petroleum coke is not too detrimental.

Example 7

Contact between the solid (feedstock 1) that is, in this example, biomass and the solid hydrocarbon (feedstock 2) that is petroleum coke is made in a fluidized bed of hot petroleum coke. The tests consisted in heating a bed of petroleum coke that is fluidized with nitrogen up to a temperature of approximately 300° C., inside a quartz reactor. The reactor, with an inside diameter of 50 mm, is placed in a tubular furnace that is heated electrically. When the fluidized bed reaches the desired temperature, a quantity (mass identical to that of petroleum coke) of wood pellets (previously oven-dried at 100° C.) is introduced into the reactor at the same time that the heating of the furnace is stopped. The results are as follows:

Petroleum coke does not lose its properties up to 360° C. under nitrogen (aside from a little attrition). There is no gaseous release.

Although after the addition of pellets, fluidization is interrupted, the coloring of the latter after the heat treatment is homogenous and there is no formation of hot points.

A test that is executed without the petroleum coke bed provides a loss of mass of the pellets that is 50% lower than with the presence of the bed and a non-homogeneous coloring. The petroleum coke bed therefore well promotes the heat exchanges.

The heat treatment process according to the invention, consisting in mixing a solid hydrocarbon with a solid such as biomass, makes it possible to carry out the drying and/or the roasting of the biomass with a better heat transfer by conduction than the techniques conventionally used and without a costly investment; there is therefore a reduction in the dwell time. This is explained by the fact that the hot petroleum coke covers the entire surface of the biomass. At isocapacity, the facilities are smaller.

In addition, the presence of the solid hydrocarbon in the mixture leads to positive effects on the subsequent grinding of the dried or roasted biomass by inducing attrition effects that make it possible to obtain rounder biomass particles that are easier to inject into the gasifier. The mixture that exits from the mill can be directly injected into a pressurized gasifier by a dry method, for example.

The stream of hot nitrogen that exits from the solid hydrocarbon mill can advantageously be used for heating this same hydrocarbon before its mixing with the solid. This makes possible heat integration that promotes energy savings.

The invention claimed is:

1. A process for heat treatment of a first solid, with a coolant solid, in which a stage for mixing the first solid with pre-heated coolant solid is carried out, with the coolant solid being a solid hydrocarbon which solid hydrocarbon is ground, before mixing with the first solid, to obtain a solid hydrocarbon powder with a grain size of between 20μm and 300μm and in which the first solid is shredded, before the mixing stage with the coolant solid, to obtain solid pellets having a thickness of between 1 mm and 30 mm, a width of between 1 mm and 40 mm, and a length of between 1 mm and 100 mm, and is heated, before mixing with the coolant solid, to 300° -592° C.

2. The process according to claim 1, in which the mixing temperature is between 80° C. and 550° C.

3. The process according to claim 1, in which the mixing is carried out in a reactor such as a rotary furnace, a screw furnace, a hearth furnace, a boiling fluidized bed or a circulating fluidized bed.

4. The process according to claim 3, in which the walls of the rotary furnace are heated at a temperature of between 80° C. and 700° C.

5. The process according to claim 1, in which the solid is biomass.

6. The process according to claim 5, in which the biomass has a level of moisture between 10 and 50%.

7. The process according to claim 1, in which the solid hydrocarbon is petroleum coke or carbon or derivatives of carbon or anthracite or deasphalting residues.

8. The process according to claim 1, in which the heat treatment is a drying treatment.

9. The process according to claim 1, in which the heat treatment is a roasting treatment.

10. The process according to claim 1, in which the heat treatment is a pyrolysis treatment.

* * * * *